Sept. 19, 1967 — A. SANCIONI — 3,342,509

TRAILER HITCH

Filed Sept. 13, 1965 — 2 Sheets-Sheet 1

INVENTOR
AURELIO SANCIONI

BY *Kimmel, Crowell & Weaver*
ATTORNEYS

Sept. 19, 1967  A. SANCIONI  3,342,509
TRAILER HITCH
Filed Sept. 13, 1965  2 Sheets-Sheet 2
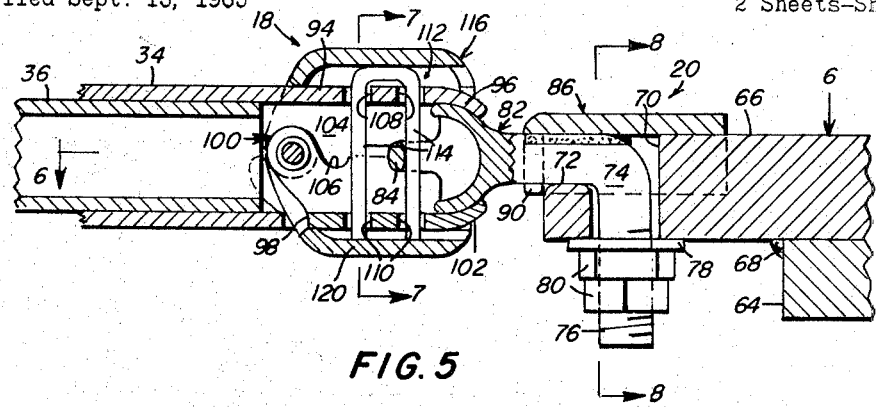
FIG. 5
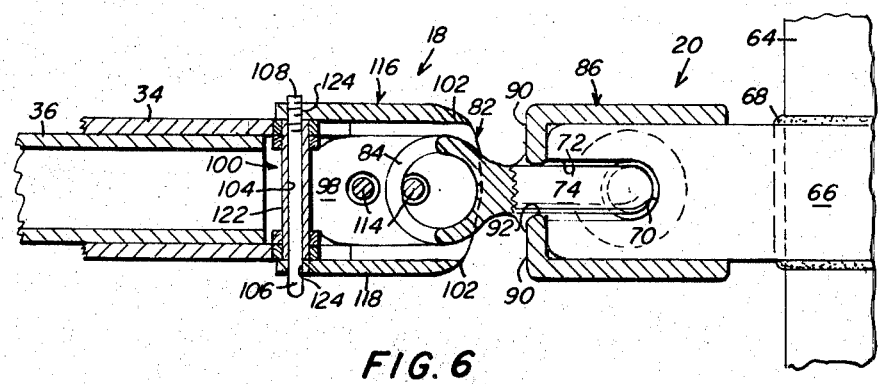
FIG. 6
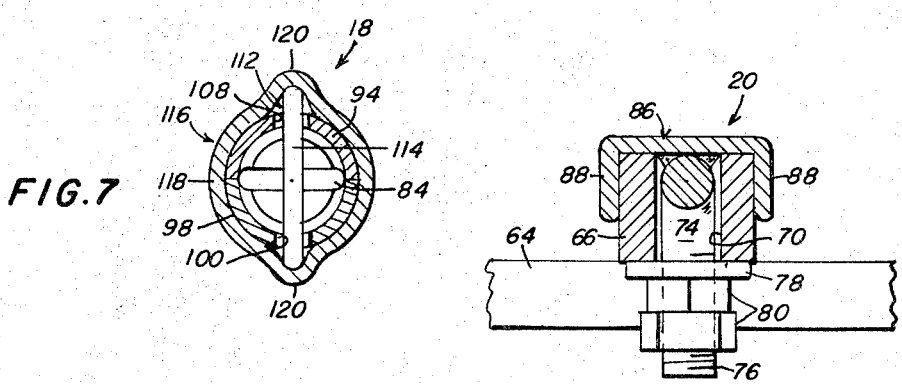
FIG. 7
FIG. 8
INVENTOR
AURELIO SANCIONI
BY Kimmel, Crowell & Weaver
ATTORNEYS.

United States Patent Office 3,342,509
Patented Sept. 19, 1967

3,342,509
TRAILER HITCH
Aurelio Sancioni, Rte. 1, Box 277,
Corning, Calif. 96021
Filed Sept. 13, 1965, Ser. No. 486,711
13 Claims. (Cl. 280—489)

ABSTRACT OF THE DISCLOSURE

A trailer hitch comprising a lower support including an overhanging lip and an arcuate cavity, a jaw having a lip and an arcuate cavity, a jaw having a lip, an arcuate cavity pivotally mounted on the support, a ball carried by a towing vehicle receivable in the two cavities, a pin extending through aligned openings in the ball and lip, a sleeve slidable over the pin. A pivotal yoke is carried by the support and overlies an upper parallel support which is connected to the trailer and a shank extends through aligned openings in both supports. Spring means surround the shank and bias the lower support toward the upper to form a shock absorber.

This invention relates to a trailer hitch, and more particularly to a trailer hitch incorporating a shock absorbing connection and means connecting the trailer hitch to a towing vehicle.

It is a primary object of the instant invention to provide a trailer hitch including a shock absorbing member whereby each of the vehicles of a vehicle train will be substantially free from oscillations of other vehicles.

Another object of the instant invention is to provide a trailer hitch composed of two pivotally connected members interconnected by a biasing member.

Still another object of the instant invention is to provide a trailer hitch including a pair of pivotally related members disposed substantially parallel for efficient transmittal of a towing force.

A still further object of the instant invention is to provide a trailer hitch having a connection with a towing vehicle which is readily removable, has few moving parts, is simple and foolproof in operation, and which does not obstruct a license plate positioned above the bumper of a towing vehicle.

Still another object of the instant invention is to provide a trailer hitch including a connection having a connecting ball positioned immediately rearwardly of the towing vehicle.

Still another object of the instant invention is to provide a trailer hitch having a connection fastened to a ball mounted on a towing vehicle providing several lock means securing the hitch to the ball.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of this inventive concept.

In the drawings:

FIGURE 5 is a longitudinal cross-sectional view of the trailer hitch of FIGURE 1 taken along line 5—5 viewing in the direction of the arrows and illustrating the ball connection;

FIGURE 6 is a longitudinal cross-sectional view of the ball connection of the instant invention taken along the line 6—6 of FIGURE 5 and viewing in the direction of the arrows;

FIGURE 7 is a transverse cross sectional view of the locking mechanism of the instant invention taken along line 7—7 of FIGURE 5; and FIGURE 8 is another transverse cross-sectional view of FIGURE 5 taken along line 8—8 thereof and viewing in the direction of the arrows.

Figure 1:
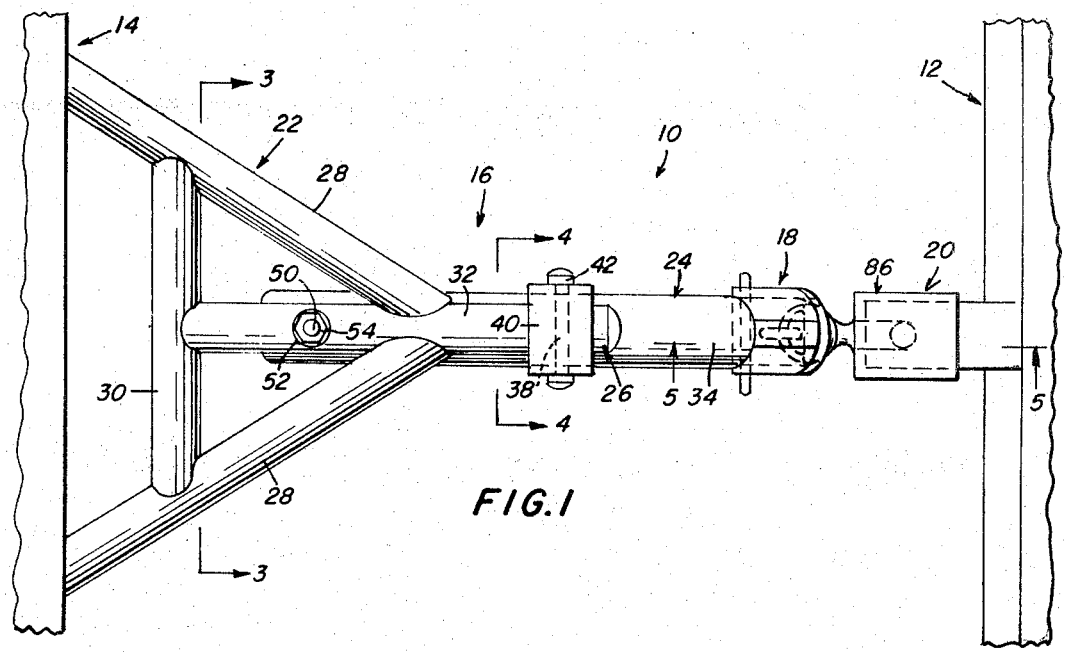
FIGURE 1 is a top plan view of the trailer hitch of the instant invention illustrated as secured to portions of a towing and a towed vehicle.
Figure 2:
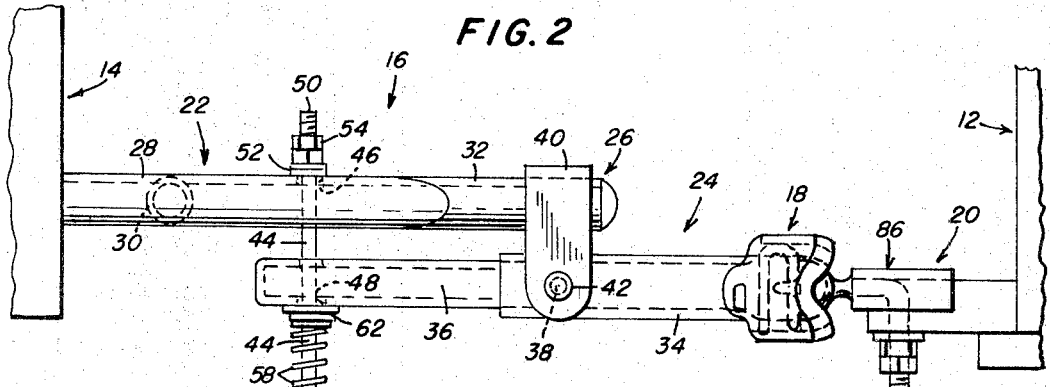
FIGURE 2 is a side elevational view of the trailer hitch of FIGURE 1 illustrating the towing vehicle and illustrated on the right.
Figure 3:
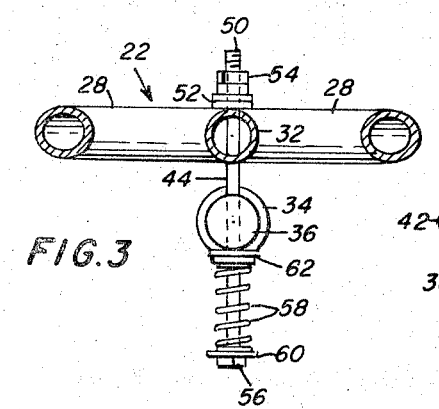
FIGURE 3 is a transverse cross-sectional view of the trailer hitch of FIGURES 1 and 2, taken along line 3—3 of FIGURE 1 viewing in the direction of the arrows.
Figure 4:
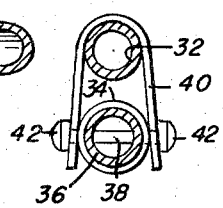
FIGURE 4 is another transverse cross-sectional view of the trailer hitch of FIGURE 1 taken along line 4—4 thereof and viewing in the direction of the arrows.

Referring now to the drawings in detail, wherein like reference characters designate like elements throughout the several views thereof, there is indicated generally at 10 a trailer hitch connecting a towing vehicle designated generally at 12 and a towed vehicle shown generally at 14. Trailer hitch 10 has as its major components a shock absorbing member 16 permanently secured to towed vehicle 14 carrying a female connection designated generally at 18 and a male connector denominated generally at 20 received in female connector 18 and fixedly secured to towing vehicle 12.

Shock absorbing member 16 includes a first support indicated generally at 22 pivotally mounted on a second support designated generally at 24 by a pivotal connector indicated generally at 26. First support 22 may be of any suitable configuration but is illustrated as including a pair of rearwardly diverging tubular beams 28 which may be welded or otherwise secured to vehicle 14 in a known manner. First support 22 also includes a transverse tubular member 30, connecting means 38 with a perpendicular tubular support 32 extending forwardly in the general direction of intended travel with beams 28 being secured thereto in any suitable manner.

Second support 24 includes an outer tubular member 34 fixedly receiving an inner tubular member 36 with female connector 18 secured on the end of outer tubular member 34. Tubular members 34, 36 which may be constructed as a single member, are mounted by a pivot pin 38 to an inverted generally U-shaped band 40 with a pair of bosses 42 positioned on the outer ends of pin 38 precluding the loss thereof. U-shaped band 40 is fixedly mounted on the terminal end of tubular support 32 of first support 22 spacing supports 22, 24 in a vertically aligned vertically separated manner. It will be seen that the nature of pivotal connection 26, which includes pivot pin 38, U-shaped band 40 and bosses 42 allows pivotal movement of first support 22 relative to second support 24 about the axis of pivot pin 38.

Shock absorbing member 16 also includes a vertically disposed shank 44 positioned in aligned openings 46, 48 in each of tubular members 32, 36 of first and second supports 22, 24. Shank 44 is threaded at one end 50 with a plurality of washers or saddles 52 being pressed against tubular support 32 by a plurality of threaded nuts 54. The other end of shank 44 carries a bolt head 56 against which a helical spring 58 presses by way of a washer 60. Spring 58 surrounds shank 44 and presses through a plurality of washers 62 against the bottom of inner tubular member 36 of second support 24.

In the utilization of trailer hitch 10, second support 24 will be connected to towing vehicle 12 with first support 16 being connected to a towed vehicle 14, although these connections may be reversed. Towing vehicle 12 will generate the forces sufficient to propel vehicles 12, 14 along an underlying road surface with forces being transmitted through hitch 10. In the event that the front wheels of towing vehicle 12 travel across a high point in the highway, the rear end of the vehicle will drop somewhat pivoting second support 24 downwardly against the resisting force of helical spring 58. If the encountered rise is small or of moderate size, helical spring 58 will absorb the rotation of second support 24 without moving first support 22 from its substantially horizontal position.

Should towed vehicle 14 contact an abrupt rise in the underlying road surface producing a rise of vehicle 14, spring 58 will again absorb the majority of the relative rotary movement between first and second supports 22, 24. From the foregoing, it should be apparent that a spring may be positioned between first and second supports 22, 24 surrounding shank 44, but the illustrated embodiment has proved preferable.

Male connector 20 is mounted on a bumper 64 on towing vehicle 12 by a rearwardly extending brace 66 as by welding or the like indicated at 68, although any other conventional securing means may be used. Brace 66 forms a vertical opening 70 through the end thereof with a horizontal opening 72 communicating therewith and extending rearwardly of vehicle 12 as may be seen in FIGURES 5 and 6. An L-shaped bolt 74 is positioned in openings 70, 72 having threads 76 on the vertical end thereof with a washer 78 and a pair of threaded nuts 80 threadably mounted thereon, and is welded to a cover plate 86.

The rearward end of bolt 74 carries a smooth geometric solid shown generally at 82, which is preferably hemispherical in nature carrying a rearwardly extending loop 84 for engagement with female connecting means 18 as more fully described hereinafter. Cover plate 86 is welded or otherwise secured to the upper surface of brace 66 and includes a pair of rearwardly extending depending arms 88 overlapping the sides of brace 66 disposed at right angles to a pair of transversely extending depending legs 90 spaced apart to form a groove 92 in which bolt 74 resides with hemisphere 82 extending rearwardly of cover plate 86.

Female connector 18 includes a lip 94 integral with outer tubular member 34 of second section 24 forming a terminal edge 86 configured to closely receive hemisphere 82 as may be seen in FIGURE 5. A jaw 98 is pivotally mounted on the forward end of outer tubular member 34 by a pivot connection shown generally at 100 and forms a terminal end 102 configured to closely receive hemisphere 82 as may be seen in FIGURES 5 and 6.

Lip 94 and jaw 98 are preferably generally half cylindrical in configuration with side walls thereof forming an externally smooth surface for purposes more fully explained hereinafter. Terminal ends 96, 102 cooperate to form a ball receiving connection in which hemisphere 82 resides. Lip 94 and jaw 98 are configured to provide at least one abutment 104 and complementarily shaped groove 106 providing structural rigidity.

Lip 94 forms a pair of longitudinally spaced apertures 108 aligned with a pair of longitudinally spaced apertures 110 in jaw 98. A U-shaped connecting pin shown generally at 112 having a pair of legs 114 are positioned in apertures 108, 110 with loop 84 of hemisphere 82 being positioned between legs 114, spaced closely adjacent forwardmost leg 114 and perpendicular thereto to provide an articulative connection. It will be seen that the cooperation of legs 114 and loop 84 restrains the separation of male connector 20 from female connector 18. It should also be noted that terminal ends 96, 102 similarly cooperate.

A sleeve shown generally at 116 surrounds lip 94 and jaw 98 to prevent jaw 98 from pivoting away from lip 94 and includes a generally cylindrical body 118 forming a pair of ridges 120 aligned with openings 108, 110 as may be seen in FIGURE 7. As will be more fully explained hereinafter, sleeve 116 may slide from a first position rearwardly of jaw 98 to allow pivotal movement thereof to a second position shown in FIGURES 5 to 7, inclusive, precluding the pivotal movement of jaw 98.

Pivot connection 100 between lip 94 and jaw 98 preferably includes a hollow tubular member 122 extending through jaw 98 and lip 94. Tube 122 is secured to lip 94 as by flanging the outer ends thereof, by welding, splinting, press fitting or the like. Tube 102 forms a conduit 104 in which is positioned an L-shaped screw 106 having a threaded end 108. Sleeve 116 is formed with a pair of threaded openings 124 receiving threaded member 108 to secure sleeve 116 in position.

In the assembly of hitch 10, sleeve 116 will be positioned in a first position surrounding outer tubular member 34 with threaded member 106 having been removed. Jaw 98 will be pivoted outwardly from its first position shown in FIGURES 5 to 7, inclusive, to a second position such that terminal edges 96, 102 provide an entrance for hemisphere 82. Female connecting means 18 will then be drawn adjacent male connector 20 with hemisphere 82 being positioned in the cavity formed by lip 94 and jaw 98 at which time jaw 98 is pivoted about the axis of pivot connection 100 to its first or closed position. U-shaped pin 112 will be inserted through apertures 108, 110 ensuring that hook 84 resides between legs 114.

It should be noted that the upper and lower ends of pin 112 extend above and below lip 94 and jaw 98 as may be seen in FIGURE 7. Sleeve 116 is then moved along outer tubular member 34 from its first position to the second position shown in FIGURES 5 to 7, inclusive, surrounding lip 94 and jaw 98. L-shaped screw 106 may then be inserted through opening 104 of pivot connection 108 with threads 108, 124 fixing sleeve 116 in place.

It should be apparent that the connection formed by male and female connectors 20, 18 provides a secure connection with both pin 112 and terminal edges 96, 102 cooperating to make the connection a secure one.

It is now seen that there is herein provided an improved trailer hitch having all of the objects of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:

1. A trailer hitch comprising a first elongate support having a longitudinal axis extending generally along the direction of intended travel providing means for connection to a towed vehicle, a second elongate support having a longitudinal axis extending generally along the direction of intended travel providing means for connecting said hitch to a towing vehicle, a portion of said second support underlying a portion of said first support, means pivotally mounting said first support on said second support including a depending band secured proximate the distal end of said first support pivotally mounting and intermediate point of said second support for pivotal movement about a horizontal axis substantially perpendicular to said direction of travel, and means connecting an intermediate point on said first support and the end portion of said second support for biasing said supports together including a vertically disposed shaft slidably received by said first and second supports extending outwardly from one of said supports carrying a spring member bearing against said one of said supports.

2. A trailer hitch comprising a support having a longitudinal axis extending in the general direction of travel providing an overhanging lip having a terminal end forming a portion of an arcuate cavity, a jaw having a terminal end forming a portion of an arcuate cavity pivotally mounted on said support adjacent said lip for movement between a first position forming a receiving cavity and opening communication therewith with said lip to a second position forming an enlarged entrance, an exteriorly smooth geometric solid positioned in said receiving cavity having means extending through said opening for attachment to a towing vehicle, means for temporarily securing said lip to said jaw when said jaw is in said first position, means for securing said geometric solid securing to said lip and jaw including at least one opening formed in said geometric solid extending from adjacent said lip to adjacent said jaw, an opening in each of said jaw and said lip aligned with said opening of said geometric solid and a pin positioned in said aligned openings.

3. The structure of claim 2 wherein said geometric solid securing means includes means for retaining said pin in said aligned openings.

4. The structure of claim 3 wherein said retaining means includes means removably surrounding said lip and said jaw, said retaining means forming a part of said lip and jaw securing means.

5. The structure of claim 4 wherein said retaining means forms a sleeve slidably mounted from a first position on said support free of said jaw to a second position surrounding at least a portion of said lip and said jaw.

6. The structure of claim 5 wherein said retaining means includes a pair of aligned apertures formed by said sleeve, at least one of said apertures being threaded, a pair of aligned apertures formed by said lip and jaw coaxial with said sleeve, a threaded member aligning said apertures extending transversely of said sleeve secured in said threaded aperture of said sleeve.

7. The structure of claim 2 including another support having means for connection to a towed vehicle, means movably mounting said another support on said support and means connected with said first and second supports biasing said supports relative to each other.

8. The structure of claim 7 wherein said movable mounting means includes an arm pivotally mounted on one of said supports extending away from the general direction of intended travel, said arm being fixed to the other of said supports positioning said first and second supports in substantially parallel relation.

9. A trailer hitch comprising:
a first elongate support;
means for securing the first elongate support to a towed vehicle for extension therefrom in the intended direction of travel;
a second elongate support underlying a portion of the first elongate support;
means pivotally connecting the second elongate support at an intermediate point to the end portion of the first elongate support;
means connecting one end portion of the second elongate support to an intermediate point on the first elongate support for biasing said supports relative to each other for relative biased pivotal movement; and
means on the other end of the second elongate support for connection to a towing vehicle.

10. The trailer hitch of claim 9 wherein the means for connection to a towing vehicle comprises:
a partial substantially spherical member which includes means extending substantially horizontally therefrom for securement to the towing vehicle; and
means secured to the second elongate member for separable connection to the partial spherical member, said means including
an upper member having therein a downwardly facing arcuate cavity for resting engagement with said partial spherical member,
a lower member pivotally secured to the second elongate member for selective engagement under the partial spherical member, and
a slidable sleeve on the second elongate member adapted to selectively secure the upper and lower members in clamping engagement with the partial spherical member.

11. The trailer hitch of claim 10 wherein:
the partial spherical member has formed therein a passageway on the side opposite the means for securement to the towing vehicle;
the upper and lower members have apertures therein for receiving a generally vertically oriented pin member;
the hitch further comprises a generally vertically oriented pin received in said apertures and extending through said passageway; and
the sleeve is adapted to slide over said pin and to secure said pin in position.

12. In a trailer hitch of the type which includes a member secured to a towing vehicle, said member having at least a partially substantially spherical surface, and means secured to a towed vehicle for selective engagement with the partially spherical member, the improvement wherein
the partially spherical member comprises,
means extending substantially horizontally rearwardly therefrom for securement to a towing vehicle; and
the means for selective engagement with the partially spherical member comprises,
an upper member having an overhanging lip adjacent an arcuate cavity, said cavity being adapted to rest on the top of said partially spherical member for engagement thereof by said lip,
a lower member pivotally secured relative to the upper member, said lower member having an upwardly facing arcuate cavity for clamping engagement with the bottom of the partially spherical member, and
a slidable sleeve adapted to surround the upper and lower member for clamping the partially spherical member in the receiving space formed by said cavities.

13. The trailer hitch of claim 12 wherein:
the partial spherical member has formed therein a passageway on the side opposite the means for securement of the towing vehicle;
the upper and lower members have apertures therein for receiving a generally vertically oriented pin member;
the hitch further comprises a generally vertically oriented pin received in said apertures and extending through said passageway; and
the sleeve is adapted to slide over said pin and to secure said pin in position.

References Cited

UNITED STATES PATENTS

| | | | |
|---|---|---|---|
| 482,546 | 9/1892 | Clarke | 280—508 |
| 2,459,965 | 1/1949 | Robertson | 280—489 |
| 2,486,605 | 11/1949 | Ladd | 280—489 |
| 2,635,892 | 4/1953 | Shutter | 280—494 X |
| 3,180,657 | 4/1965 | Molter | 280—489 |

FOREIGN PATENTS

| | | |
|---|---|---|
| 534,775 | 12/1956 | Canada. |
| 928,592 | 6/1947 | France. |

LEO FRIAGLIA, *Primary Examiner.*